US012585516B2

(12) United States Patent
Zhang et al.

(10) Patent No.: US 12,585,516 B2
(45) Date of Patent: Mar. 24, 2026

(54) METHOD AND APPARATUS FOR VEHICLE APPLICATION

(71) Applicant: Telefonaktiebolaget LM Ericsson (publ), Stockholm (SE)

(72) Inventors: Fengpei Zhang, Guangzhou (CN); Xinmei Ke, Guangzhou (CN); Yingsheng Chen, Guangzhou (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/702,907

(22) PCT Filed: Oct. 20, 2021

(86) PCT No.: PCT/CN2021/125007
§ 371 (c)(1),
(2) Date: Apr. 19, 2024

(87) PCT Pub. No.: WO2023/065154
PCT Pub. Date: Apr. 27, 2023

(65) Prior Publication Data
US 2025/0252003 A1     Aug. 7, 2025

(51) Int. Cl.
*G06F 11/07*          (2006.01)
*G06F 8/65*           (2018.01)

(52) U.S. Cl.
CPC ............ *G06F 11/0739* (2013.01); *G06F 8/65* (2013.01); *G06F 11/0775* (2013.01); *G06F 11/0793* (2013.01)

(58) Field of Classification Search
CPC .... G06F 8/65; G06F 11/0739; G06F 11/0775; G06F 11/0793
See application file for complete search history.

(56) References Cited

U.S. PATENT DOCUMENTS

| | | | |
|---|---|---|---|
| 7,062,670 B1 | 6/2006 | Larsson et al. | |
| 9,406,177 B2 * | 8/2016 | Attard ................. | G07C 5/0808 |
| 9,558,060 B1 | 1/2017 | Cessac et al. | |
| 10,169,988 B2 * | 1/2019 | Kozloski .............. | G06V 20/176 |

(Continued)

FOREIGN PATENT DOCUMENTS

| | | |
|---|---|---|
| CN | 107992321 A | 5/2018 |
| CN | 110045973 A | 7/2019 |

(Continued)

OTHER PUBLICATIONS

Extended European Search Report, European Patent Application No. 21960910.4, mailed Nov. 8, 2024, 17 pages.

(Continued)

*Primary Examiner* — Joseph R Kudirka
(74) *Attorney, Agent, or Firm* — Sage Patent Group

(57)          ABSTRACT
Various embodiments of the present disclosure provide a method for vehicle application. The method which may be performed by a first vehicle device includes: receiving first information from an application server. The first information indicates one or more software fault impacts related to a software fault of the first vehicle device. In accordance with an exemplary embodiment, the method further includes: transmitting an indication of the one or more software fault impacts to a second vehicle device.

19 Claims, 10 Drawing Sheets

(56)                References Cited

U.S. PATENT DOCUMENTS

| 10,261,777 | B2 |  | 4/2019 | Fox |  |
|---|---|---|---|---|---|
| 2014/0122931 | A1 |  | 5/2014 | Devale et al. |  |
| 2016/0170775 | A1 |  | 6/2016 | Rockwell et al. |  |
| 2017/0269986 | A1 |  | 9/2017 | Sobue et al. |  |
| 2019/0053000 | A1 | * | 2/2019 | Filippou | G06F 8/76 |
| 2020/0092374 | A1 |  | 3/2020 | Mehta et al. |  |
| 2020/0218531 | A1 |  | 7/2020 | Kushwaha et al. |  |
| 2021/0218825 | A1 | * | 7/2021 | Sharma | G06F 8/65 |
| 2021/0224056 | A1 |  | 7/2021 | John |  |

FOREIGN PATENT DOCUMENTS

| CN | 110489143 | A |  | 11/2019 |  |
|---|---|---|---|---|---|
| CN | 111133412 | A |  | 5/2020 |  |
| CN | 111211929 | A |  | 5/2020 |  |
| CN | 111385191 | A |  | 7/2020 |  |
| CN | 112698854 | A |  | 4/2021 |  |
| GB | 2524393 | A |  | 9/2015 |  |
| KR | 101538331 | B1 | * | 7/2015 | H04L 67/34 |
| WO | WO-2019149599 | A1 | * | 8/2019 | H04W 4/50 |

OTHER PUBLICATIONS

Huawei, "Add Solutions of Fault Management," 3GPP TR 23.700-99 V0.2.0, 3GPP TSG-SA WG6 Meeting #45-bis-e, S6-212393, e-meeting, Oct. 11-19, 2021, (XP052071360) 4 pages.
International Search Report and Written Opinion of the International Searching Authority, PCT/CN2021/125007, mailed Jun. 23, 2022, 10 pages.
ETSI EN 302 637-2 V1.4.1 (Jan. 2019) (Final Draft); European Standard; Intelligent Transport Systems (ITS); Vehicular Communications; Basic Set of Applications; Part 2: Specification of Cooperative Awareness Basic Service, 45 pages.
ETSI TS 102 894-2 V1.3.1 (Aug. 2018); Technical Specification; Intelligent Transport Systems (ITS); Users and applications requirements; Part 2: Applications and facilities layer common data dictionary, 100 pages.

* cited by examiner

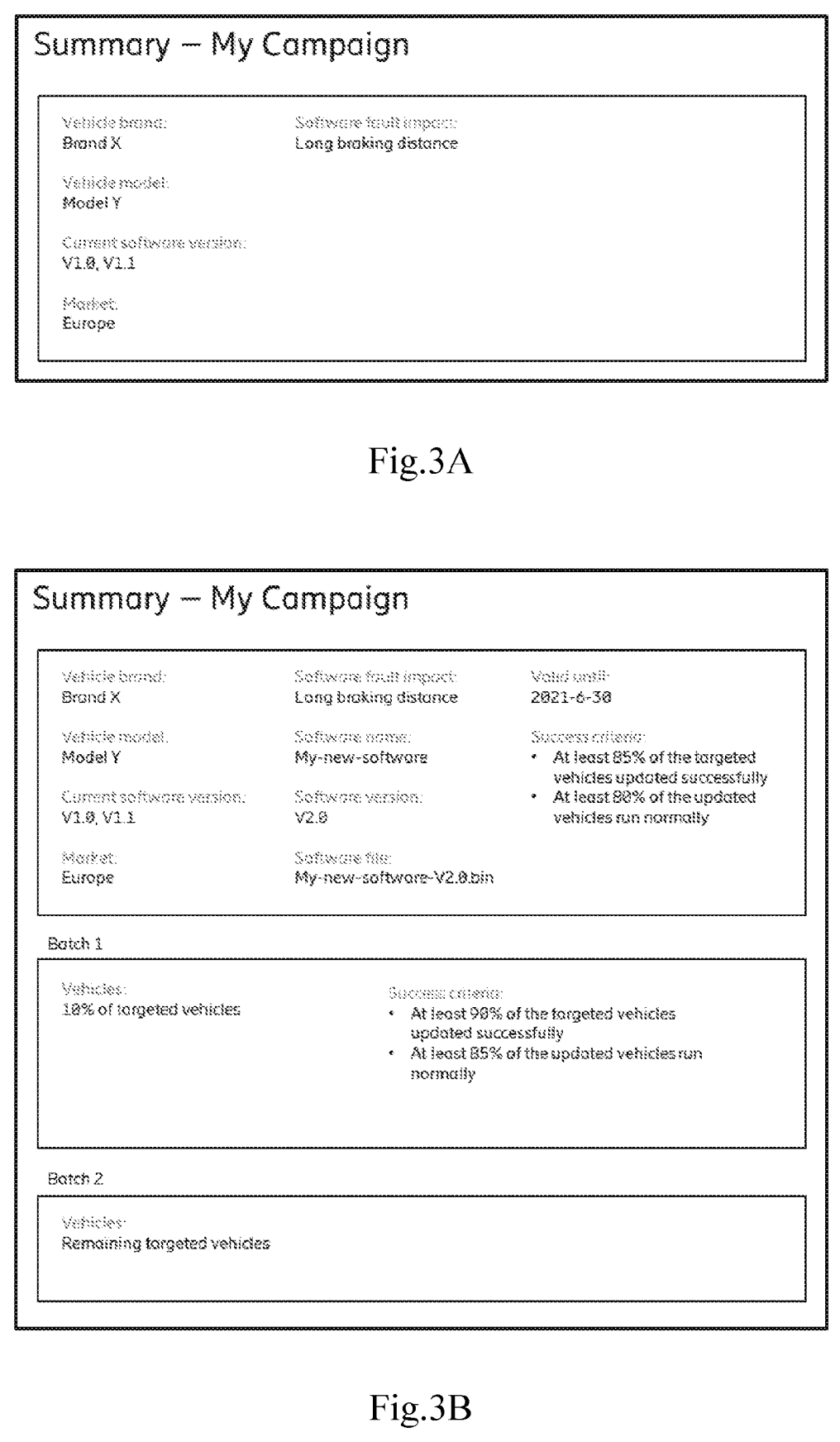

Summary — My Campaign

Vehicle brand:
Brand X

Software fault impact:
Long braking distance

Vehicle model:
Model Y

Current software version:
V1.0, V1.1

Market:
Europe

Fig.3A

Summary — My Campaign

Vehicle brand:
Brand X

Software fault impact:
Long braking distance

Valid until:
2021-6-30

Vehicle model:
Model Y

Software name:
My-new-software

Success criteria:
• At least 85% of the targeted vehicles updated successfully
• At least 80% of the updated vehicles run normally Current software version:
V1.0, V1.1

Software version:
V2.0

Market:
Europe

Software file:
My-new-software-V2.0.bin

Batch 1

Vehicles:
10% of targeted vehicles

Success criteria:
• At least 90% of the targeted vehicles updated successfully
• At least 85% of the updated vehicles run normally Batch 2

Vehicles:
Remaining targeted vehicles

Fig.3B

| Descriptive Name | SpecialVehicleContainer |
|---|---|
| ASN.1 representation | SpecialVehicleContainer ::= CHOICE {<br>    publicTransportContainer PublicTransportContainer,<br>    specialTransportContainer SpecialTransportContainer,<br>    dangerousGoodsContainer DangerousGoodsContainer,<br>    roadWorksContainerBasic RoadWorksContainerBasic,<br>    rescueContainer RescueContainer,<br>    emergencyContainer EmergencyContainer,<br>    safetyCarContainer SafetyCarContainer,<br>    softwareFaultImpactContainer SoftwareFaultImpactContainer,<br>    ...<br>} |

Fig.4B

| Descriptive Name | SoftwareFaultImpactContainer |
|---|---|
| ASN.1 representation | SoftwareFaultImpactContainer ::= SEQUENCE {<br>    impactDetail ImpactDetailContainer,<br>    faultMessage UTF8String,<br>    ...<br>}<br><br>ImpactDetailContainer ::= CHOICE {<br>    brakingSystemFault BrakingSystemFault<br>    ...<br>}<br><br>BrakingSystemFault ::= BIT STRING {<br>    longBrakingDistance (0),<br>    brakeLightFailure (1)<br>} (SIZE (2)) |

METHOD AND APPARATUS FOR VEHICLE APPLICATION

CROSS REFERENCE TO RELATED APPLICATIONS

This application is a 35 U.S.C. § 371 national stage application of PCT International Application No. PCT/CN2021/125007 filed on Oct. 20, 2021, the disclosure and content of which is incorporated by reference herein in its entirety.

FIELD OF THE INVENTION

The present disclosure generally relates to communication networks, and more specifically, to a method and apparatus for vehicle application.

BACKGROUND

This section introduces aspects that may facilitate a better understanding of the disclosure. Accordingly, the statements of this section are to be read in this light and are not to be understood as admissions about what is in the prior art or what is not in the prior art.

In automotive industry, previously when there is any problem on the software in a car/vehicle or there is a need for a car/vehicle system to upgrade, the driver may have to go to the dealer to upgrade through an on board diagnostics (OBD) interface. This procedure may be called "recall". With the over-the-air (OTA) technology, the car/vehicle can download the package through network and upgrade it easily. There are two types of OTA, one is firmware-over-the-air (FOTA) which upgrades firmware over the air, another is software-over-the-air (SOTA) which upgrade software over the air.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In recent years, a vehicle has become more and more intelligent and smart. There may be a trend that vehicles are primarily controlled by software rather than traditional mechanical components, which is also known as software-defined vehicles (SDV). SDV can offer a chance to upgrade a vehicle's functionality via OTA updates, giving a vehicle the ability to continually adapt to the needs of drivers and fleet operators. Software based solutions may transform operating and ownership models. However, there may be a time gap between software fault identification and fixing. During this period, the faulty vehicles may bring potential risk to other vehicles nearby. Therefore, it may be desirable to mitigate a software fault impact of a faulty vehicle in a more efficient way.

Various exemplary embodiments of the present disclosure propose a solution for vehicle application, which can enable a faulty vehicle device (e.g., a car, a vehicle, an in-vehicle device, etc.) to inform its software fault impact(s) to one or more other vehicle devices, so as to avoid or reduce some potential risks due to software fault and enhance driving safety.

According to a first aspect of the present disclosure, there is provided a method performed by a first vehicle device (e.g., a vehicle, a car, a device installed or mounted in a vehicle/car, etc.). The method comprises: receiving first information from an application server (e.g., an OTA server, etc.). The first information indicates one or more software fault impacts related to a software fault of the first vehicle device. In accordance with an exemplary embodiment, the method further comprises: transmitting an indication of the one or more software fault impacts to a second vehicle device.

In accordance with an exemplary embodiment, the first information may include a report identifier which is associated with a report of the one or more software fault impacts to be created by the first vehicle device.

In accordance with an exemplary embodiment, the method according to the first aspect of the present disclosure may further comprise: creating a report of the one or more software fault impacts, according to the first information.

In accordance with an exemplary embodiment, the method according to the first aspect of the present disclosure may further comprise: transmitting, to the application server, an indication of that the report of the one or more software fault impacts is created by the first vehicle device.

In accordance with an exemplary embodiment, the method according to the first aspect of the present disclosure may further comprise: taking one or more actions to mitigate a potential risk related to the one or more software fault impacts.

In accordance with an exemplary embodiment, the method according to the first aspect of the present disclosure may further comprise: performing an OTA update procedure for the first vehicle device, according to an OTA campaign created for the one or more software fault impacts by the application server.

In accordance with an exemplary embodiment, the method according to the first aspect of the present disclosure may further comprise: receiving second information about the one or more software fault impacts from the application server, when the OTA update procedure is performed successfully.

In accordance with an exemplary embodiment, the second information may include a report identifier which is associated with a report of the one or more software fault impacts created by the first vehicle device.

In accordance with an exemplary embodiment, the method according to the first aspect of the present disclosure may further comprise: removing a report of the one or more software fault impacts created by the first vehicle device, according to the second information.

In accordance with an exemplary embodiment, the method according to the first aspect of the present disclosure may further comprise: transmitting, to the application server, an indication of that the report of the one or more software fault impacts is removed by the first vehicle device.

In accordance with an exemplary embodiment, the method according to the first aspect of the present disclosure may further comprise: stopping the transmission of the indication of the one or more software fault impacts from the first vehicle device to the second vehicle device, in response to the reception of the second information.

According to a second aspect of the present disclosure, there is provided an apparatus which may be implemented as a first vehicle device. The apparatus may comprise one or more processors and one or more memories storing computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a first vehicle device. The apparatus may comprise a receiving unit and a transmitting unit. In accordance with some exemplary embodiments, the receiving unit may be operable to carry out at least the receiving step of the method according to the first aspect of the present disclosure. The transmitting unit may be operable to carry out at least the transmitting step of the method according to the first aspect of the present disclosure.

According to a fifth aspect of the present disclosure, there is provided a method performed by a second vehicle device (e.g., a vehicle, a car, a device installed or mounted in a vehicle/car, etc.). The method comprises: receiving, from a first vehicle device, an indication of one or more software fault impacts related to a software fault of the first vehicle device.

In accordance with an exemplary embodiment, the method according to the fifth aspect of the present disclosure may further comprise: transmitting, to a management server, a query about whether the first vehicle device has the software fault.

In accordance with an exemplary embodiment, the method according to the fifth aspect of the present disclosure may further comprise: receiving a response to the query from the management server. In an embodiment, the response to the query may include recall information related to the software fault.

In accordance with an exemplary embodiment, the method according to the fifth aspect of the present disclosure may further comprise: performing one or more actions to mitigate a potential risk related to the one or more software fault impacts.

In accordance with an exemplary embodiment, the second vehicle device may perform the one or more actions to mitigate the potential risk related to the one or more software fault impacts, when determining that the first vehicle device has the software fault.

According to a sixth aspect of the present disclosure, there is provided an apparatus which may be implemented as a second vehicle device. The apparatus may comprise one or more processors and one or more memories storing computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a second vehicle device. The apparatus may comprise a receiving unit and optionally a performing unit. In accordance with some exemplary embodiments, the receiving unit may be operable to carry out at least the receiving step of the method according to the fifth aspect of the present disclosure. The performing unit may be operable to carry out at least the performing step of the method according to the fifth aspect of the present disclosure.

According to a ninth aspect of the present disclosure, there is provided a method performed by an application server (e.g., an OTA server, etc.). The method comprises: identifying a software fault. In accordance with an exemplary embodiment, the method further comprises: transmitting first information to a first vehicle device having the software fault. The first information indicates one or more software fault impacts related to the software fault and facilitates transmission of an indication of the one or more software fault impacts from the first vehicle device to a second vehicle device.

In accordance with an exemplary embodiment, the first information may include a report identifier which is associated with a report of the one or more software fault impacts to be created by the first vehicle device.

In accordance with an exemplary embodiment, the method according to the ninth aspect of the present disclosure may further comprise: receiving, from the first vehicle device, an indication of that a report of the one or more software fault impacts is created by the first vehicle device.

In accordance with an exemplary embodiment, the method according to the ninth aspect of the present disclosure may further comprise: creating an OTA campaign for the one or more software fault impacts, in response to the identification of the software fault.

In accordance with an exemplary embodiment, the method according to the ninth aspect of the present disclosure may further comprise: determining target vehicle devices of the OTA campaign. The first vehicle device may be one of the target vehicle devices of the OTA campaign.

In accordance with an exemplary embodiment, the method according to the ninth aspect of the present disclosure may further comprise: updating the OTA campaign, according to software updating information for fixing the software fault.

In accordance with an exemplary embodiment, the method according to the ninth aspect of the present disclosure may further comprise: performing an OTA update procedure for the first vehicle device, according to the OTA campaign.

In accordance with an exemplary embodiment, the method according to the ninth aspect of the present disclosure may further comprise: transmitting second information about the one or more software fault impacts to the first vehicle device, when the OTA update procedure is performed successfully.

In accordance with an exemplary embodiment, the second information may include a report identifier which is associated with a report of the one or more software fault impacts created by the first vehicle device.

In accordance with an exemplary embodiment, the method according to the ninth aspect of the present disclosure may further comprise: receiving, from the first vehicle device, an indication of that a report of the one or more software fault impacts created by the first vehicle device is removed by the first vehicle device.

In accordance with an exemplary embodiment, the method according to the ninth aspect of the present disclosure may further comprise: transmitting, to a management server, a request for vehicle device management related to the software fault. In an embodiment, the vehicle device management may comprise creating a recall related to the software fault.

In accordance with an exemplary embodiment, the method according to the ninth aspect of the present disclosure may further comprise: receiving management information for the vehicle device management from the management server. In an embodiment, the management information may include an identifier of a recall related to the software fault.

In accordance with an exemplary embodiment, the method according to the ninth aspect of the present disclosure may further comprise: transmitting, to the management server, first update information for updating the vehicle device management.

In accordance with an exemplary embodiment, the first update information may include: an identifier of a recall related to the software fault; and/or vehicle identification numbers of target vehicle devices of an OTA campaign for the one or more software fault impacts, etc.

In accordance with an exemplary embodiment, the method according to the ninth aspect of the present disclosure may further comprise: receiving, from the management server, an indication of that the recall related to the software fault is updated successfully.

In accordance with an exemplary embodiment, the method according to the ninth aspect of the present disclosure may further comprise: transmitting, to the management server, second update information for updating the vehicle device management.

In accordance with an exemplary embodiment, the second update information may include: an identifier of a recall related to the software fault; vehicle identification numbers of target vehicle devices of an OTA campaign for the one or more software fault impacts; and/or OTA updating status of the target vehicle devices, etc.

In accordance with an exemplary embodiment, the method according to the ninth aspect of the present disclosure may further comprise: receiving, from the management server, an indication of that a status of the recall related to the software fault is updated successfully.

According to a tenth aspect of the present disclosure, there is provided an apparatus which may be implemented as an application server. The apparatus may comprise one or more processors and one or more memories storing computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as an application server. The apparatus may comprise an identifying unit and a transmitting unit. In accordance with some exemplary embodiments, the identifying unit may be operable to carry out at least the identifying step of the method according to the ninth aspect of the present disclosure. The transmitting unit may be operable to carry out at least the transmitting step of the method according to the ninth aspect of the present disclosure.

According to a thirteenth aspect of the present disclosure, there is provided a method performed by a management server (e.g., a recall management system, etc.). The method comprises: receiving, from an application server, a request for vehicle device management related to a software fault. In accordance with an exemplary embodiment, the method further comprises: determining management information for the vehicle device management. For a first vehicle device having the software fault, an indication of one or more software fault impacts related to the software fault is transmitted from the first vehicle device to a second vehicle device.

In accordance with an exemplary embodiment, the vehicle device management may comprise creating a recall related to the software fault.

In accordance with an exemplary embodiment, the method according to the thirteenth aspect of the present disclosure may further comprise: transmitting the management information for the vehicle device management to the application server. In an embodiment, the management information may include an identifier of a recall related to the software fault.

In accordance with an exemplary embodiment, the method according to the thirteenth aspect of the present disclosure may further comprise: receiving, from the application server, first update information for updating the vehicle device management.

In accordance with an exemplary embodiment, the first update information may include: an identifier of a recall related to the software fault; and/or vehicle identification numbers of target vehicle devices of an OTA campaign for the one or more software fault impacts, etc.

In accordance with an exemplary embodiment, the method according to the thirteenth aspect of the present disclosure may further comprise: transmitting, to the application server, an indication of that the recall related to the software fault is updated successfully.

In accordance with an exemplary embodiment, the method according to the thirteenth aspect of the present disclosure may further comprise: receiving, from the second vehicle device, a query about whether the first vehicle device has the software fault.

In accordance with an exemplary embodiment, the method according to the thirteenth aspect of the present disclosure may further comprise: transmitting a response to the query to the second vehicle device. In an embodiment, the response to the query may include recall information related to the software fault.

In accordance with an exemplary embodiment, the method according to the thirteenth aspect of the present disclosure may further comprise: receiving, from the application server, second update information for updating the vehicle device management.

In accordance with an exemplary embodiment, the second update information may include: an identifier of a recall related to the software fault; vehicle identification numbers of target vehicle devices of an OTA campaign for the one or more software fault impacts; and/or OTA updating status of the target vehicle devices, etc.

In accordance with an exemplary embodiment, the method according to the thirteenth aspect of the present disclosure may further comprise: transmitting, to the application server, an indication of that a status of the recall related to the software fault is updated successfully.

According to a fourteenth aspect of the present disclosure, there is provided an apparatus which may be implemented as a management server. The apparatus may comprise one or more processors and one or more memories storing computer program codes. The one or more memories and the computer program codes may be configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus which may be implemented as a management server. The apparatus may comprise a receiving unit and a determining unit. In accordance with some exemplary embodiments, the receiving unit may be operable to carry out at least the receiving step of the method according to the thirteenth aspect of the present disclosure. The determining unit may be operable to carry out at least the determining step of the method according to the thirteenth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 3A is a diagram illustrating an exemplary initial OTA campaign graphical user interface (GUI) according to an embodiment of the present disclosure;

FIG. 3B is a diagram illustrating an exemplary updated OTA campaign GUI according to an embodiment of the present disclosure;

FIGS. 4B-4C are diagrams illustrating exemplary syntax representations according to some embodiments of the present disclosure;

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Vehicle-to-everything (V2X) is a technology that allows vehicles to communicate with any entity that may affect the vehicle, and vice versa. V2X consists of more specific types of communication as vehicle-to-infrastructure (V2I), vehicle-to-network (V2N), vehicle-to-vehicle (V2V), vehicle-to-pedestrian (V2P), etc.

Figure 1:
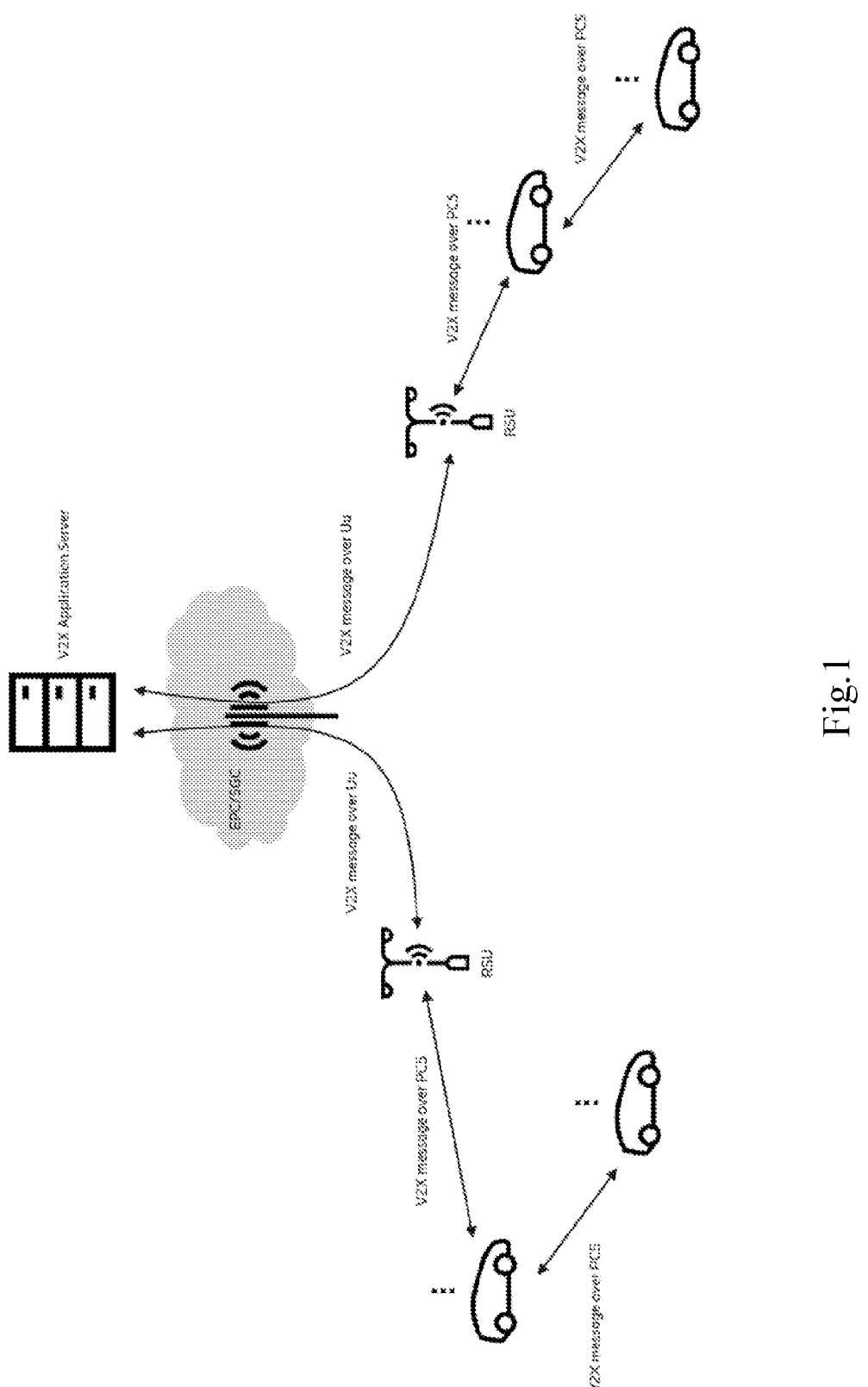
FIG. 1 is a diagram illustrating an exemplary network architecture according to an embodiment of the present disclosure.

FIG. 1 is a diagram illustrating an exemplary network architecture according to an embodiment of the present disclosure. Cellular vehicle-to-everything (C-V2X) may be applied in the network architecture shown in FIG. 1. C-V2X may allow a C-V2X device (e.g., a vehicle, a car, an in-vehicle device, etc.) to use the cellular network connection in the traditional manner over Uu interface. The Uu interface may refer to the logical interface between a user equipment (UE) and a base station. This is generally referred to V2N. However, due to the huge amount of message exchange especially for V2V communication, the 3rd generation partnership project (3GPP) also introduces PC5 interface (also known as "sidelink" in 3GPP radio access network (RAN) specification) to support direct communication between C-V2X devices to improve the C-V2X efficiency. As shown in FIG. 1, a vehicle may communicate with a road side unit (RSU) and/or another vehicle via a V2X message over PC5, and the RSU may communicate with an evolved packet core/fifth generation core (EPC/5GC) network through a RAN via a V2X message over Uu, so as to obtain services provided by a V2X application server. V2X may also be essential for safe and efficient autonomous driving. For example, V2X communication can alert the autonomous driving vehicle about objects it cannot directly see (non-line-of-sight).

An OTA server may support the firmware/software update of a vehicle, e.g., according to static information of the vehicle such as the vehicle model, the current firmware/software version, the battery level, etc. When a software fault (e.g., a long braking distance, a trailer brake light failure, etc.) is identified, a software update procedure may be initiated between the vehicle and the OTA server, and the vehicle can upgrade the software version to fix the software fault through OTA. However, even if the software fault can be identified in time, it may still take a period of time to fix the software fault. Before the software fault is fixed, the vehicle with the software fault may pose a potential safety risk to other vehicles nearby.

Today, safety recalls of automotive products are strictly monitored by management organizations or governments, but safety related OTA not yet. It may be critical to monitor and expose safety related OTA in the same way as safety recall to mitigate the safety risk.

Various exemplary embodiments of the present disclosure propose a solution for vehicle application to enable a vehicle's software fault impact(s) to be signaled (e.g., broadcast through V2V messaging) to one or more other vehicles. In accordance with an exemplary embodiment, an OTA server can manage the faulty vehicles so that the faulty vehicles can broadcast their software fault impacts to others through V2V messaging until the fault has been fixed by an OTA update.

Figure 2A:
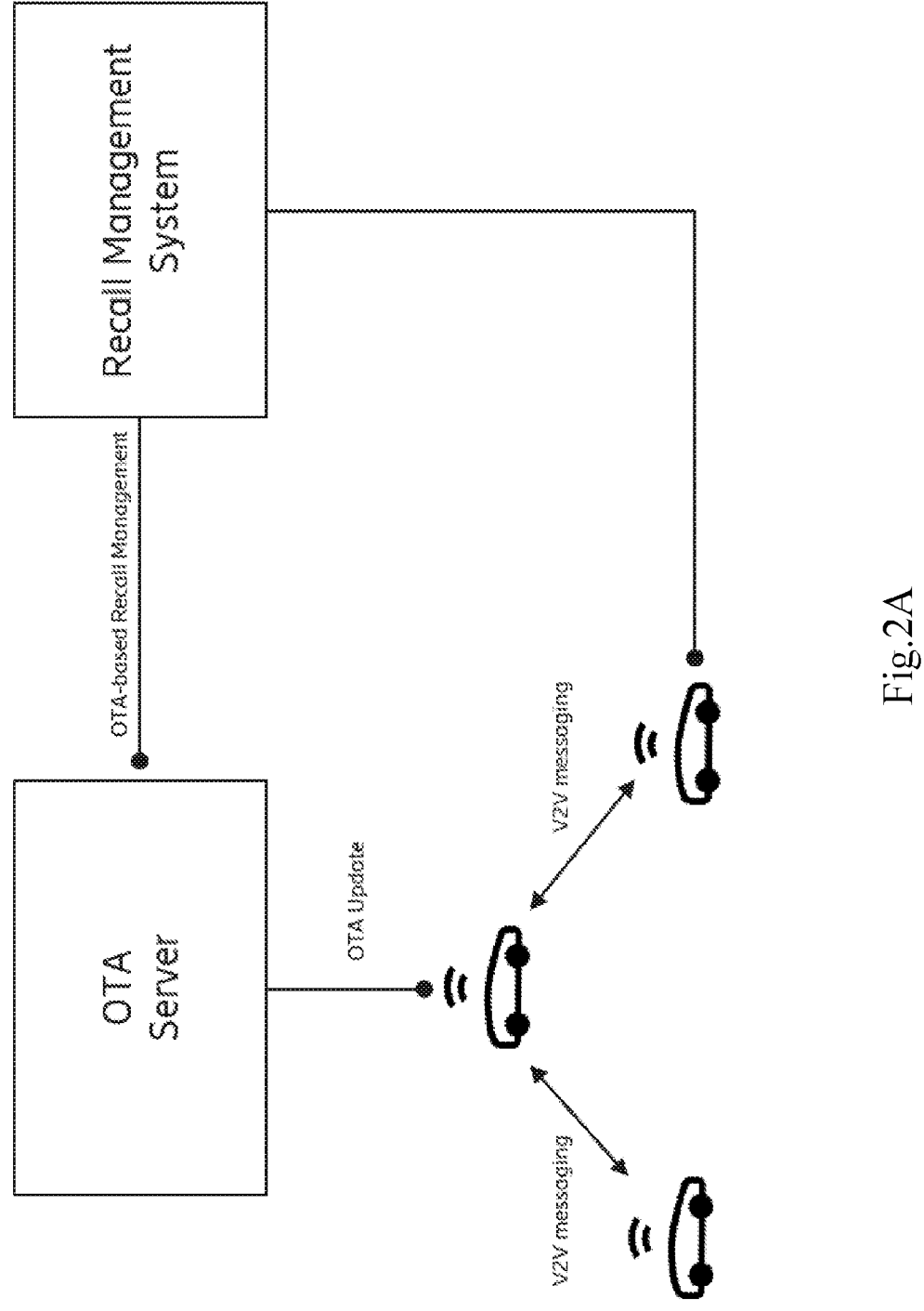
FIG. 2A is a diagram illustrating an exemplary system architecture according to an embodiment of the present disclosure.

FIG. 2A is a diagram illustrating an exemplary system architecture according to an embodiment of the present disclosure. For simplicity, FIG. 2A only schematically depicts some sub-systems in the exemplary system architecture, e.g., including vehicles connected to the system, an OTA server and a recall management system. As shown in FIG. 2A, a vehicle with network connectivity can communicate bidirectionally with other systems or entities outside the vehicle. A connected vehicle also can communicate with another vehicle using direct communication technologies such as PC5 or dedicated short-range communications (DSRC). The OTA server can provide remote firmware/software service for the connected vehicles. The main functions of the OTA server may include software management, campaign management, vehicle communication and etc. The recall management system may be owned by a management organization or the government to monitor the recalls (e.g., including OTA-based recalls) initiated by car original equipment manufacturers (OEMs). The system may also provide the recall data to public access.

As shown in FIG. 2A, various interfaces may be configured for different sub-systems to support information exchange and data communication. For example, the OTA server may provide an OTA update interface to interact with connected vehicles for an OTA update procedure. A connected vehicle may use direct communication technology, e.g., PC5 to exchange information with others via a V2V messaging interface. The recall management system may provide an OTA-based recall management interface to integrate with the OTA server of car OEMs to receive OTA-based recall information.

It can be appreciated that the sub-systems and various interfaces shown in FIG. 2A are just as examples, and more or less alternative sub-systems and interfaces may be involved in the SDV OTA according to embodiments of the present disclosure.

Application of various exemplary embodiments can make safety related OTA open and transparent, and mitigate the safety risk brought by SDV through leveraging the C-V2X technology. In accordance with exemplary embodiments, an OTA server may start OTA campaign management from fault identification, which can extent OTA campaign management lifecycle. The OTA server may inform a faulty vehicle to start broadcasting one or more software fault impacts to others, e.g., through V2V messaging. When receiving one or more software fault impacts from others, a vehicle may take an action to mitigate the potential risk. In an embodiment, the OTA server may inform the vehicle to stop broadcasting the software fault impact(s) to others once the fault has been fixed by an OTA update.

Figure 2B:
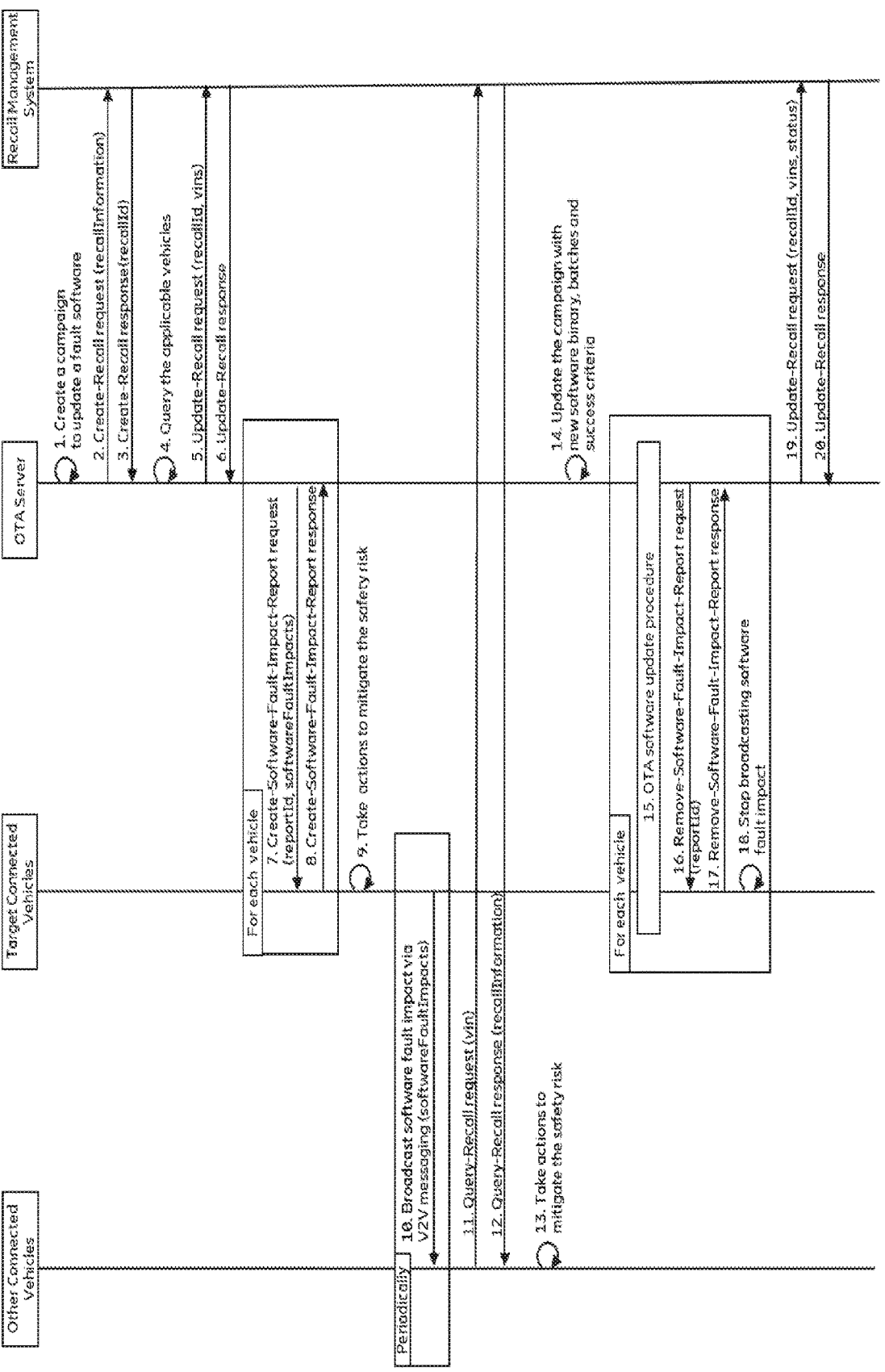
FIG. 2B is a diagram illustrating an exemplary procedure according to an embodiment of the present disclosure.

FIG. 2B is a diagram illustrating an exemplary procedure according to an embodiment of the present disclosure. The procedure may be used to manage the faulty vehicles so that the faulty vehicles may inform their software fault impacts to other vehicles. As shown in FIG. 2B, the procedure may include the following operations:

1. An OTA campaign may be created in an OTA server once a software fault is identified. FIG. 3A is a diagram illustrating an exemplary initial OTA campaign GUI according to an embodiment of the present disclosure. In the GUI example of OTA campaign summary shown in FIG. 3A, the campaign may contain:

General vehicle targeting information, such as "Vehicle brand", "Vehicle model", "Current software version" and "Market".

Software fault impact.

2. The OTA server may call a recall management system to create a recall with recall relevant information.

3. The recall management system may send a successful response (e.g., including a recall identifier (ID), etc.) to the OTA server.

4. The OTA server may query the target vehicles using the campaign information.

5. The OTA server may call the recall management system to update the created recall with the vehicle identification numbers (VINs) of the target vehicles.

6. The recall management system may send a successful response to the OTA server.

7. For each target vehicle, the OTA server may send a "Create-Software-Fault-Impact-Report" request to this target vehicle. In an embodiment, the "Create-Software-Fault-Impact-Report" request may include a report ID and software fault impact data.

8. The target vehicle may send a "Create-Software-Fault-Impact-Report" response to the OTA server.

9. After receiving the "Create-Software-Fault-Impact-Report" request from the OTA server, the target vehicle may take one or more actions to mitigate the potential risk, e.g., change the driving mode, etc.

10. The target vehicle may start broadcasting the software fault impact(s), e.g., through V2V messaging periodically. Some security mechanism may be applied in the V2V messaging, e.g., a certificate to ensure the data origin authentication and integrity, etc.

11. When another vehicle receives a message for reporting the software fault impact(s) of the target vehicle, in an embodiment, the other vehicle may validate the message with the certificate. After the validation, in order to detect the fraud, the other vehicle that receives the message for reporting the software fault impact(s) may query the recall management system to validate whether the target vehicle that broadcasts the software fault impact(s) really has a software fault related to the reported software fault impact(s). In an embodiment, the other vehicle may send a "Query-Recall" request to the recall management system, and the VIN of the target vehicle may be included in the "Query-Recall" request.

12. The recall management system may return the valid recall information relevant to the requested VIN, e.g., in a "Query-Recall" response to the other vehicle.

13. The other vehicle that receives the message for reporting the software fault impact(s) may take one or more actions to mitigate the potential risk. For example, if the software fault impact is "long braking distance":

An autonomous driving vehicle may keep an enough distance to the target vehicle.

A human driving vehicle may alert the human driver to keep an enough distance to the target vehicle.

14. When the updated software for fixing the identified fault is ready, the OTA campaign may be updated. FIG. 3B is a diagram illustrating an exemplary updated OTA campaign GUI according to an embodiment of the present disclosure. In the GUI example of updated OTA campaign summary shown in FIG. 3B, the updated information may contain:

Software information: indicating the software package that may be updated to the targeted vehicles.

Scheduling information.

Campaign success criteria.

Batches: splitting the targeted vehicles into several batches (e.g., Batch 1 and Batch 2 in FIG. 3B) for the stepwise roll-out.

15. For each target vehicle, the OTA server may execute the OTA update procedure.

16. After a successful OTA update, the OTA server may send a report removal request such as "Remove-Software-Fault-Impact-Report" request to the target vehicle. In an embodiment, the "Remove-Software-Fault-Impact-Report" request may include the previously created report ID.

17. The target vehicle may send a "Remove-Software-Fault-Impact-Report" response to the OTA server.

18. After receiving the report removal request from the OTA server, the target vehicle may stop broadcasting the software fault impact(s) through V2V messaging.

19. The OTA server may call the recall management system to update the recall status with the VINs of vehicles that have been successfully OTA updated.

20. The recall management system may send a successful response to the OTA server.

It can be appreciated that network elements and signaling messages shown in FIG. 2B are just as examples, and more or less alternative network elements and signaling messages may be involved in the procedure for managing the faulty vehicles according to various embodiments of the present disclosure.

In accordance with an exemplary embodiment, a message for reporting a software fault impact may be implemented by using a cooperative awareness message (CAM), e.g., as defined by specifications of European Telecommunications Standards Institute (ETSI) European Norm (EN) 302 637-2 V1.4.1 and ETSI Technical Specification (TS) 102 894-2 V1.3.1. CAMs are messages exchanged in the intelligent transport system (ITS) network between intelligent transport system-stations (ITS-Ss) (e.g., vehicle ITS-S, personal ITS-S, etc.) to create and maintain awareness of each other and to support cooperative performance of vehicles using the road network.

A CAM may contain status and attribute information of the originating ITS-S. For vehicle ITS-Ss, the status information may include time, position, motion state, activated systems, etc., and the attribute information may include data about the dimensions, vehicle type and role in the road traffic, etc.

A CAM may consist of one common ITS packet data unit (PDU) header and multiple containers. All CAMs generated by a vehicle ITS-S may include at least a "High Frequency Vehicle (Vehicle HF) Container", and optionally a "Low Frequency Vehicle (Vehicle LF) Container":

A Vehicle HF Container may contain all fast-changing (dynamic) status information of the vehicle ITS-S such as heading or speed.

A Vehicle LF Container may contain static or slow-changing vehicle data such as the status of the exterior lights.

Figure 4A:
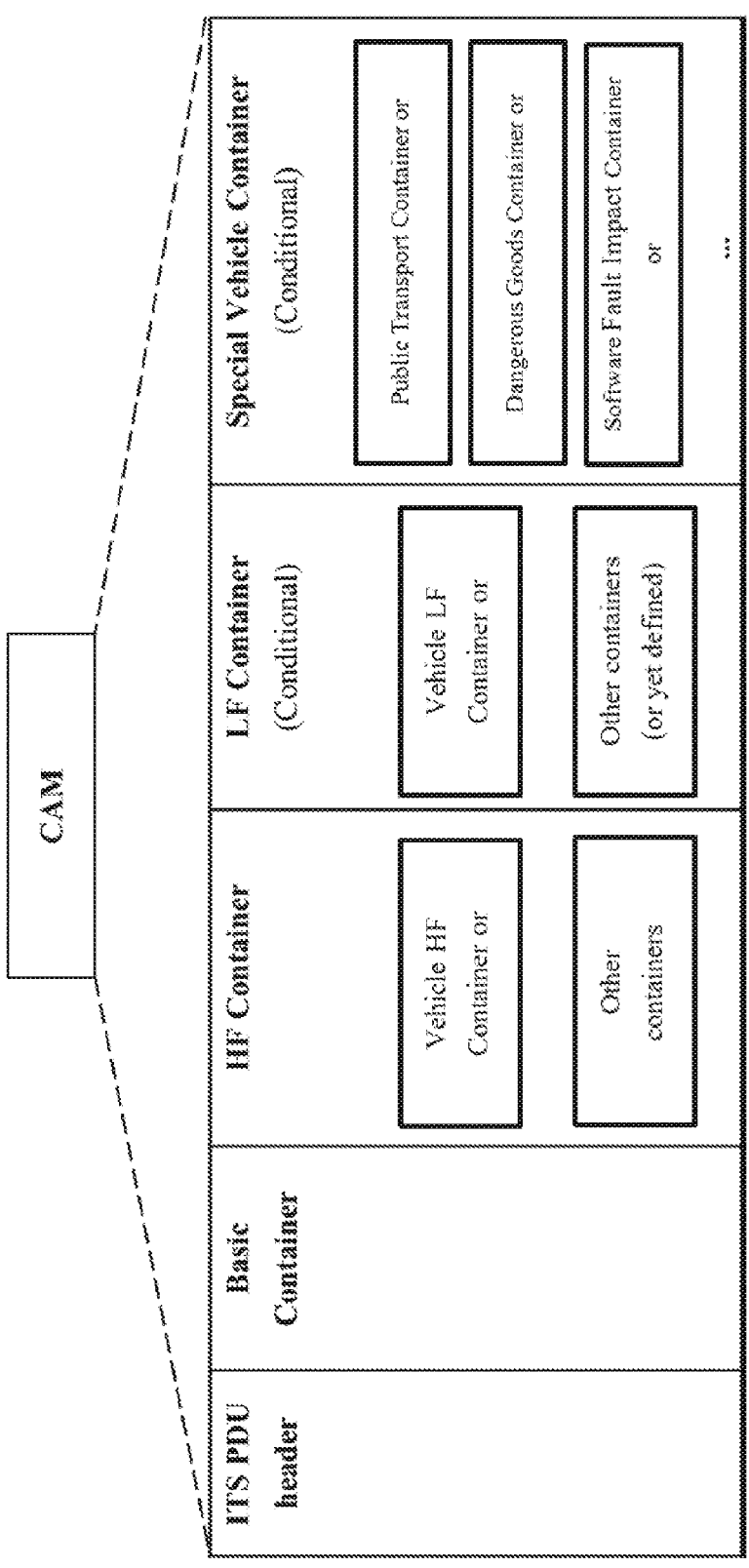
FIG. 4A is a diagram illustrating an exemplary structure of a cooperative awareness message (CAM) according to an embodiment of the present disclosure.

FIG. 4A is a diagram illustrating an exemplary structure of a CAM according to an embodiment of the present disclosure. As shown in FIG. 4A, in addition to an ITS PDU header, a basic container, an HF container and an LF container, the CAM may also contain a "Special Vehicle Container" (e.g., including "Public Transport Container", "Dangerous Goods Container", "Software Fault Impact Container", etc.). Vehicle ITS-Ss which have a specific role in road traffic such as dangerous goods transport may provide further status information in the "Special Vehicle Container". In an embodiment, the "Special Vehicle Container" may be extended with a new "Software Fault Impact Container" to carry the software fault impact information.

FIGS. 4B-4C are diagrams illustrating exemplary syntax representations according to some embodiments of the present disclosure. FIG. 4B shows the abstract syntax notation one (ASN.1) representation of the extended "Special Vehicle Container", and FIG. 4C shows the ASN.1 representation of the "Software Fault Impact Container". Two scenarios, i.e. "long braking distance" and "brake light failure" are described in FIG. 4C as an example of a braking system fault. It can be appreciated that more or less faults and/or more or less scenarios may be further described in the "Software Fault Impact Container".

Figure 5A:
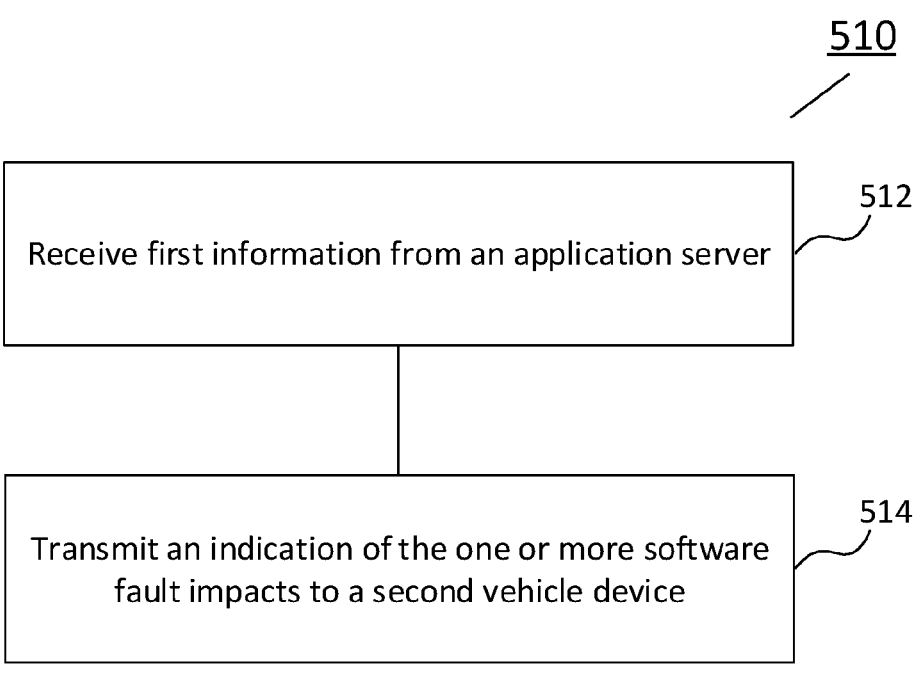
FIGS. 5A-5D are flowcharts illustrating various methods according to some embodiments of the present disclosure.

FIG. 5A is a flowchart illustrating a method 510 according to some embodiments of the present disclosure. The method 510 illustrated in FIG. 5A may be performed by a first vehicle device (e.g., a vehicle, a car, a device installed or mounted in a vehicle/car, etc.) or an apparatus communicatively coupled to the first vehicle device. In accordance with an exemplary embodiment, the first vehicle device may be configured to communicate with an application server (e.g., an OTA server, etc.) to obtain various vehicle services (e.g., software/firmware update, etc.) provided by the application server. In accordance with another exemplary embodiment, the first vehicle device may be configured to communicate with a management server (e.g., a recall management system, etc.) to receive management information of one or more vehicles or in-vehicle devices. In accordance with another exemplary embodiment, the first vehicle device may be configured to support D2D communications so as to exchange information with one or more other devices (e.g., via V2X messaging, etc.).

According to the exemplary method 510 illustrated in FIG. 5A, the first vehicle device may receive first information from an application server, as shown in block 512. The first information may indicate one or more software fault impacts related to a software fault of the first vehicle device. In accordance with an exemplary embodiment, the first vehicle device may transmit an indication of the one or more software fault impacts to a second vehicle device, as shown in block 514.

In accordance with an exemplary embodiment, the first information may include a report identifier which is associated with a report of the one or more software fault impacts to be created by the first vehicle device. In an embodiment, according to the first information, the first vehicle device may create a report of the one or more software fault impacts. In another embodiment, the first vehicle device may transmit, to the application server, an indication of that the report of the one or more software fault impacts is created by the first vehicle device.

In accordance with an exemplary embodiment, the first vehicle device may take one or more actions to mitigate a potential risk related to the one or more software fault impacts. In accordance with another exemplary embodiment, the first vehicle device may perform an OTA update procedure for the first vehicle device, according to an OTA campaign created for the one or more software fault impacts by the application server.

In accordance with an exemplary embodiment, when the OTA update procedure is performed successfully, the first vehicle device may receive second information about the one or more software fault impacts from the application server. In an embodiment, the second information may include a report identifier which is associated with a report of the one or more software fault impacts created by the first vehicle device. In another embodiment, according to the second information, the first vehicle device may remove a report of the one or more software fault impacts created by the first vehicle device. In this case, the first vehicle device may transmit, to the application server, an indication of that the report of the one or more software fault impacts is removed by the first vehicle device.

In accordance with an exemplary embodiment, the first vehicle device may stop the transmission of the indication of the one or more software fault impacts from the first vehicle device to the second vehicle device, in response to the reception of the second information.

Figure 5B:
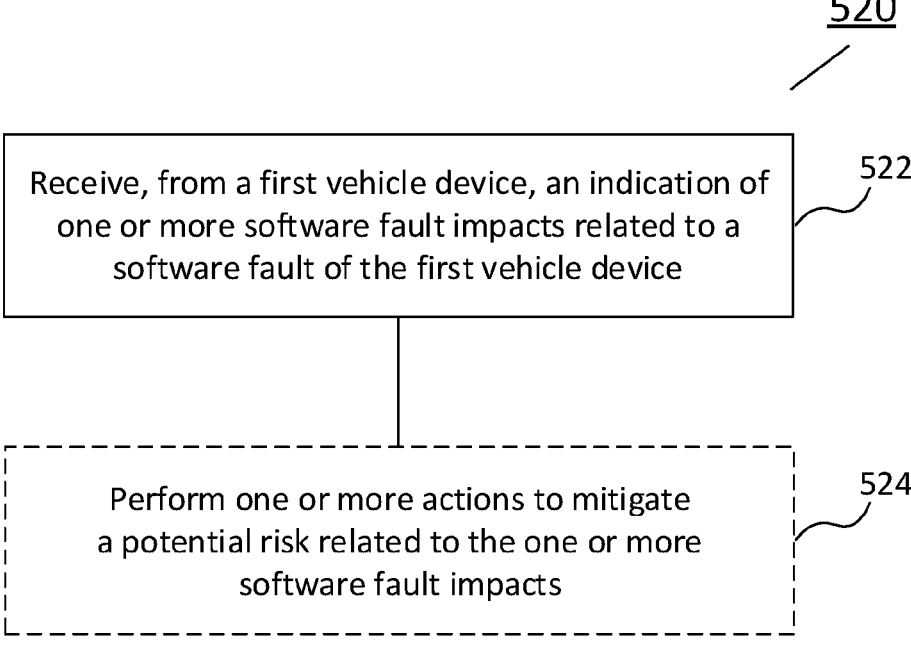

FIG. 5B is a flowchart illustrating a method 520 according to some embodiments of the present disclosure. The method 520 illustrated in FIG. 5B may be performed by a second vehicle device (e.g., a vehicle, a car, a device installed or mounted in a vehicle/car, etc.) or an apparatus communicatively coupled to the second vehicle device. In accordance with an exemplary embodiment, the second vehicle device may be configured to communicate with an application server (e.g., an OTA server, etc.) to obtain various vehicle services (e.g., software/firmware update, status detection, performance evaluation, etc.) provided by the application server. In accordance with another exemplary embodiment, the second vehicle device may be configured to communicate with a management server (e.g., a recall management system, etc.) to receive management information of one or more vehicles or in-vehicle devices. In accordance with another exemplary embodiment, the second vehicle device may be configured to support D2D communications so as to exchange information with one or more other devices (e.g., via V2X messaging, etc.).

According to the exemplary method 520 illustrated in FIG. 5B, the second vehicle device may receive, from a first vehicle device (e.g., the first vehicle device as described with respect to FIG. 5A), an indication of one or more software fault impacts related to a software fault of the first vehicle device, as shown in block 522. In accordance with an exemplary embodiment, the second vehicle device may optionally perform one or more actions to mitigate a potential risk related to the one or more software fault impacts, as shown in block 524. In an embodiment, the second vehicle device may perform the one or more actions to mitigate the potential risk related to the one or more software fault impacts, when determining that the first vehicle device has the software fault.

In accordance with an exemplary embodiment, the second vehicle device may transmit, to a management server, a query about whether the first vehicle device has the software fault. In accordance with another exemplary embodiment, the second vehicle device may receive a response to the query from the management server. According to an embodiment, the response to the query may include recall information related to the software fault. For example, the recall information related to the software fault may indicate whether the first vehicle device needs to be recalled due to the software fault.

Figure 5C:
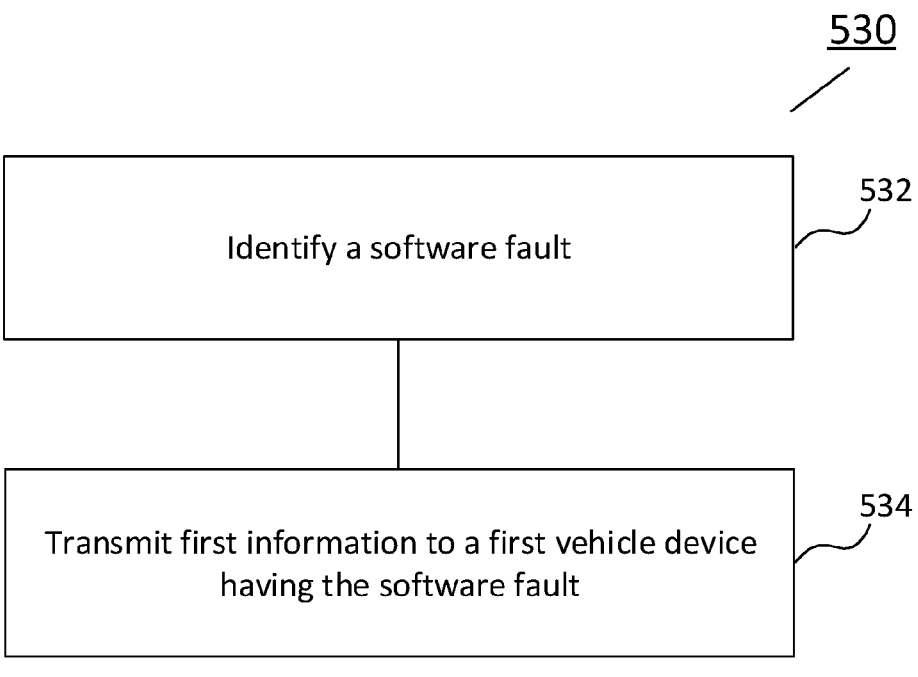

FIG. 5C is a flowchart illustrating a method 530 according to some embodiments of the present disclosure. The method 530 illustrated in FIG. 5C may be performed by an application server (e.g., an OTA server, etc.) or an apparatus communicatively coupled to the application server. In accordance with an exemplary embodiment, the application server may be configured to support or provision various vehicle services (e.g., software/firmware update, data collection and analysis, status detection, performance evaluation, etc.) to one or more vehicle devices. In an exemplary embodiment, the application server may be configured to communicate with a management server (e.g., a recall management system, etc.) to implement application provision and/or management of one or more vehicles or in-vehicle devices.

According to the exemplary method 530 illustrated in FIG. 5C, the application server may identify a software fault, as shown in block 532. In accordance with an exemplary embodiment, the application server may transmit first information to a first vehicle device (e.g., the first vehicle device as described with respect to FIG. 5A) having the software fault, as shown in block 534. The first information may indicate one or more software fault impacts related to the software fault and facilitates transmission of an indication of the one or more software fault impacts from the first vehicle device to a second vehicle device (e.g., the second vehicle device as described with respect to FIG. 5B).

In accordance with an exemplary embodiment, the first information may include a report identifier which is associated with a report of the one or more software fault impacts to be created by the first vehicle device. In an embodiment, the application server may receive, from the first vehicle device, an indication of that a report of the one or more software fault impacts is created by the first vehicle device.

In accordance with an exemplary embodiment, the application server may create an OTA campaign for the one or more software fault impacts, in response to the identification of the software fault. In an embodiment, the application server may determine target vehicle devices of the OTA campaign. The first vehicle device may be one of the target vehicle devices of the OTA campaign.

In accordance with an exemplary embodiment, the application server may update the OTA campaign, according to software updating information for fixing the software fault. In an embodiment, the application server may perform an OTA update procedure for the first vehicle device, according to the OTA campaign.

In accordance with an exemplary embodiment, the application server may transmit second information about the one or more software fault impacts to the first vehicle device, when the OTA update procedure is performed successfully. In an embodiment, the second information may include a report identifier which is associated with a report of the one or more software fault impacts created by the first vehicle device.

In accordance with an exemplary embodiment, the application server may receive, from the first vehicle device, an indication of that a report of the one or more software fault impacts created by the first vehicle device is removed by the first vehicle device.

In accordance with an exemplary embodiment, the application server may transmit, to a management server, a request for vehicle device management related to the software fault. In an embodiment, the vehicle device management may comprise creating a recall related to the software fault.

In accordance with an exemplary embodiment, the application server may receive management information for the vehicle device management from the management server. In an embodiment, the management information may include an identifier of a recall related to the software fault.

In accordance with an exemplary embodiment, the application server may transmit, to the management server, first update information for updating the vehicle device management. In an embodiment, the first update information may include one or more of:

an identifier of a recall related to the software fault; and vehicle identification numbers of target vehicle devices of an OTA campaign for the one or more software fault impacts, etc.

In accordance with an exemplary embodiment, the application server may receive, from the management server, an indication of that the recall related to the software fault is updated successfully.

In accordance with an exemplary embodiment, the application server may transmit, to the management server, second update information for updating the vehicle device management. In an embodiment, the second update information may include one or more of:

an identifier of a recall related to the software fault;

vehicle identification numbers of target vehicle devices of an OTA campaign for the one or more software fault impacts; and OTA updating status of the target vehicle devices, etc.

In accordance with an exemplary embodiment, the application server may receive, from the management server, an indication of that a status of the recall related to the software fault is updated successfully.

Figure 5D:
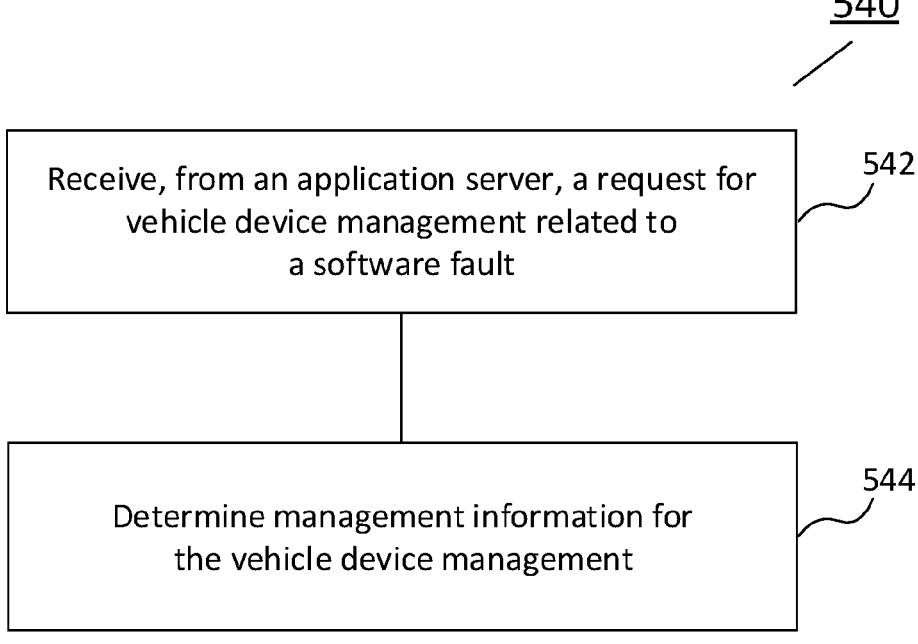

FIG. 5D is a flowchart illustrating a method 540 according to some embodiments of the present disclosure. The method 540 illustrated in FIG. 5D may be performed for a management server (e.g., a recall management system, etc.). In accordance with an exemplary embodiment, the management server may be configured to implement management of one or more vehicles or in-vehicle devices, e.g., via an application server (e.g., an OTA server, etc.).

According to the exemplary method 540 illustrated in FIG. 5D, the management server may receive, from an application server, a request for vehicle device management related to a software fault, as shown in block 542. According to an embodiment, the vehicle device management may comprise creating a recall related to the software fault. In accordance with an exemplary embodiment, the management server may determine management information for the vehicle device management, as shown in block 544. For a first vehicle device having the software fault, an indication of one or more software fault impacts related to the software fault may be transmitted from the first vehicle device to a second vehicle device.

In accordance with an exemplary embodiment, the management server may transmit the management information for the vehicle device management to the application server. In an embodiment, the management information may include an identifier of a recall related to the software fault.

In accordance with an exemplary embodiment, the management server may receive, from the application server, first update information for updating the vehicle device management. In an embodiment, the first update information may include: an identifier of a recall related to the software fault; and/or vehicle identification numbers of target vehicle devices of an OTA campaign for the one or more software fault impacts, etc. According to an exemplary embodiment, the management server may transmit, to the application server, an indication of that the recall related to the software fault is updated successfully.

In accordance with an exemplary embodiment, the management server may receive, from the second vehicle device, a query about whether the first vehicle device has the software fault. In accordance with another exemplary embodiment, the management server may transmit a response to the query to the second vehicle device. According to an exemplary embodiment, the response to the query may include recall information related to the software fault.

In accordance with an exemplary embodiment, the management server may receive, from the application server, second update information for updating the vehicle device management. In an embodiment, the second update information may include: an identifier of a recall related to the software fault; vehicle identification numbers of target vehicle devices of an OTA campaign for the one or more software fault impacts; and/or OTA updating status of the target vehicle devices, etc. According to an exemplary embodiment, the management server may transmit, to the application server, an indication of that a status of the recall related to the software fault is updated successfully.

The various blocks shown in FIGS. 5A-5D may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
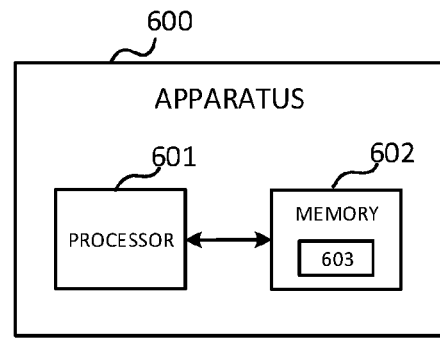
FIG. 6 is a block diagram illustrating an apparatus according to an embodiment of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a first vehicle device as described with respect to FIG. 5A, or a second vehicle device as described with respect to FIG. 5B, or an application server as described with respect to FIG. 5C, or a management server as described with respect to FIG. 5D. In such cases, the apparatus 600 may be implemented as a first vehicle device as described with respect to FIG. 5A, or a second vehicle device as described with respect to FIG. 5B, or an application server as described with respect to FIG. 5C, or a management server as described with respect to FIG. 5D.

In some implementations, the one or more memories 602 and the computer program codes 603 may be configured to, with the one or more processors 601, cause the apparatus 600 at least to perform any operation of the method as described in connection with FIG. 5A. In other implementations, the one or more memories 602 and the computer program codes 603 may be configured to, with the one or more processors 601, cause the apparatus 600 at least to perform any operation of the method as described in connection with FIG. 5B. In other implementations, the one or more memories 602 and the computer program codes 603 may be configured to, with the one or more processors 601, cause the apparatus 600 at least to perform any operation of the method as described in connection with FIG. 5C. In other implementations, the one or more memories 602 and the computer program codes 603 may be configured to, with the one or more processors 601, cause the apparatus 600 at least to perform any operation of the method as described in connection with FIG. 5D. Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7A:
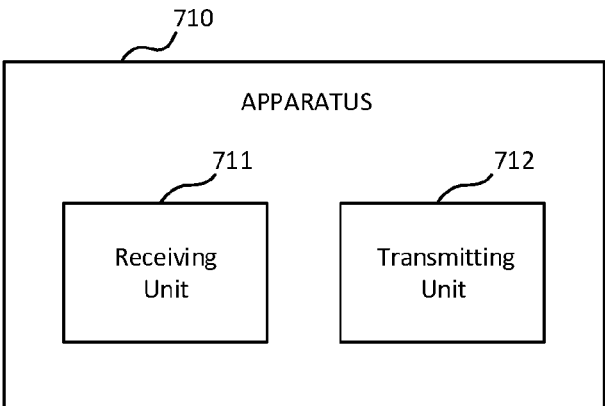
FIG. 7A-7D are block diagrams illustrating various apparatus according to some embodiments of the present disclosure.

FIG. 7A is a block diagram illustrating an apparatus 710 according to some embodiments of the present disclosure. As shown in FIG. 7A, the apparatus 710 may comprise a receiving unit 711 and a transmitting unit 712. In an exemplary embodiment, the apparatus 710 may be implemented in a first vehicle device. The receiving unit 711 may be operable to carry out the operation in block 512, and the transmitting unit 712 may be operable to carry out the operation in block 514. Optionally, the receiving unit 711 and/or the transmitting unit 712 may be operable to carry out more or less operations to implement the proposed methods according to the exemplary embodiments of the present disclosure.

Figure 7B:
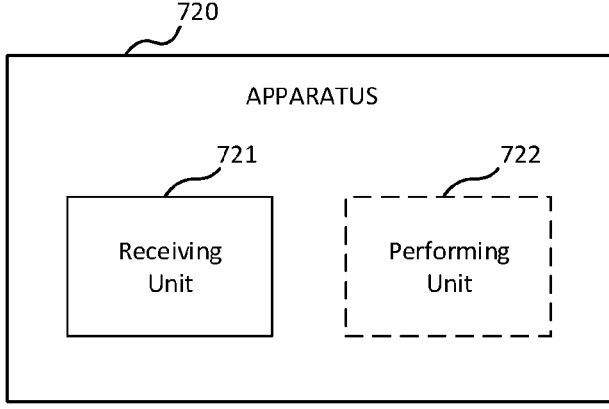

FIG. 7B is a block diagram illustrating an apparatus 720 according to some embodiments of the present disclosure. As shown in FIG. 7B, the apparatus 720 may comprise a receiving unit 721 and optionally a performing unit 722. In an exemplary embodiment, the apparatus 720 may be implemented in a second vehicle device. The receiving unit 721 may be operable to carry out the operation in block 522, and the performing unit 722 may be operable to carry out the operation in block 524. Optionally, the receiving unit 721 and/or the performing unit 722 may be operable to carry out more or less operations to implement the proposed methods according to the exemplary embodiments of the present disclosure. In an embodiment, the apparatus 720 may comprise a transmitting unit (not shown in FIG. 7B) for transmitting various kinds of information from the apparatus 720 to other devices (e.g., a vehicle device, a server, etc.).

Figure 7C:
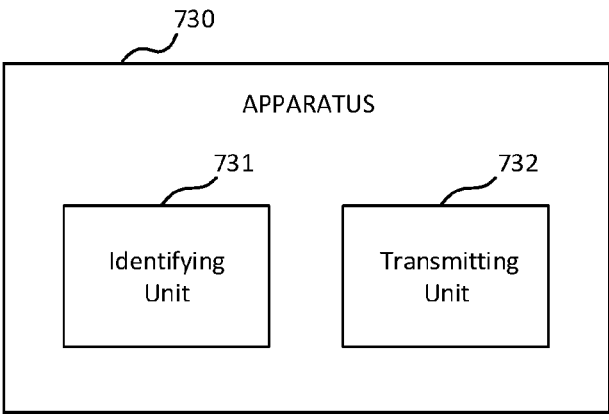

FIG. 7C is a block diagram illustrating an apparatus 730 according to some embodiments of the present disclosure. As shown in FIG. 7C, the apparatus 730 may comprise an identifying unit 731 and a transmitting unit 732. In an exemplary embodiment, the apparatus 730 may be implemented in an application server. The identifying unit 731 may be operable to carry out the operation in block 532, and the transmitting unit 732 may be operable to carry out the operation in block 534. Optionally, the identifying unit 731 and/or the transmitting unit 732 may be operable to carry out more or less operations to implement the proposed methods according to the exemplary embodiments of the present disclosure. In an embodiment, the apparatus 730 may comprise a receiving unit (not shown in FIG. 7C) for receiving various kinds of information from other devices (e.g., a vehicle device, a management server, etc.).

Figure 7D:
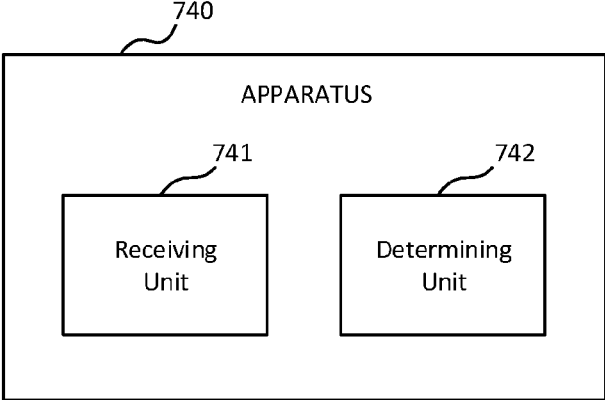

FIG. 7D is a block diagram illustrating an apparatus 740 according to some embodiments of the present disclosure. As shown in FIG. 7D, the apparatus 740 may comprise a receiving unit 741 and a determining unit 742. In an exemplary embodiment, the apparatus 740 may be implemented in a management server. The receiving unit 741 may be operable to carry out the operation in block 542, and the determining unit 742 may be operable to carry out the operation in block 544. Optionally, the receiving unit 741 and/or the determining unit 742 may be operable to carry out more or less operations to implement the proposed methods according to the exemplary embodiments of the present disclosure. In an embodiment, the apparatus 740 may comprise a transmitting unit (not shown in FIG. 7D) for transmitting various kinds of information from the apparatus 740 to other devices (e.g., a vehicle device or an application server, etc.).

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first vehicle device, comprising:
   responsive to a software fault at the first vehicle device, receiving first information from an application server, the first information indicating one or more software fault impacts related to the software fault of the first vehicle device; and
   transmitting an indication of the one or more software fault impacts to a second vehicle device.

2. The method of claim 1, wherein the first information includes a report identifier which is associated with a report of the one or more software fault impacts to be created by the first vehicle device.

3. The method of claim 1, further comprising:
   creating a report of the one or more software fault impacts based on the first information; and
   transmitting, to the application server, an indication that the report of the one or more software fault impacts is created by the first vehicle device.

4. The method of claim 1, further comprising:
   taking one or more actions to mitigate a potential risk related to the one or more software fault impacts.

5. The method of claim 1, further comprising:
   performing an over-the-air ("OTA") update procedure for the first vehicle device based on an OTA campaign created for the one or more software fault impacts by the application server.

6. The method of claim 5, further comprising:
   receiving second information about the one or more software fault impacts from the application server, when the OTA update procedure is performed successfully.

7. The method of claim 6, wherein the second information includes a report identifier which is associated with a report of the one or more software fault impacts created by the first vehicle device.

8. The method of claim 6, further comprising:
   removing a report of the one or more software fault impacts created by the first vehicle device based on the second information; and
   transmitting, to the application server, an indication that the report of the one or more software fault impacts is removed by the first vehicle device.

9. The method of claim 6, further comprising:
   stopping the transmission of the indication of the one or more software fault impacts from the first vehicle device to the second vehicle device in response to the reception of the second information.

10. A first vehicle device, comprising:
   processing circuitry; and
   memory coupled to the processing circuitry and having instructions stored therein that are executable by the processing circuitry to cause the first vehicle device to perform operations comprising:
      responsive to a software fault at the first vehicle device, receiving first information from an application server, the first information indicating one or more software fault impacts related to the software fault of the first vehicle device; and
      transmitting an indication of the one or more software fault impacts to a second vehicle device.

11. A method performed by a second vehicle device, the method comprising:
   transmitting, to a management server, a query about whether a first vehicle device has a software fault;
   receiving a response to the query from the management server; and
   receiving, from the first vehicle device, an indication of one or more software fault impacts related to the software fault of the first vehicle device.

12. The method of claim 11, wherein the response to the query includes recall information related to the software fault.

13. The method of claim 11, further comprising:
   performing one or more actions to mitigate a potential risk related to the one or more software fault impacts.

14. The method of claim 13, wherein the second vehicle device performs the one or more actions to mitigate the potential risk related to the one or more software fault impacts, when determining that the first vehicle device has the software fault.

15. A second vehicle device, comprising:
   processing circuitry; and
   memory coupled to the processing circuitry and having instructions stored therein that are executable by the processing circuitry to cause the second vehicle device to perform operations comprising:
      transmitting, to a management server, a query about whether a first vehicle device has a software fault;
      receiving a response to the query from the management server; and
      receiving, from the first vehicle device, an indication of one or more software fault impacts related to the software fault of the first vehicle device.

16. A method performed by an application server, comprising:
   responsive to a query associated with a first vehicle device, transmitting first information to the first vehicle device having a software fault, the first information indicating:
      one or more software fault impacts related to the software fault; and
      instructions to transmit an indication of the one or more software fault impacts from the first vehicle device to a second vehicle device.

17. The method of claim 16, further comprising:
   creating an over-the-air ("OTA") campaign for the one or more software fault impacts, in response to the identification of the software fault.

18. The method of claim 17, further comprising:
   determining target vehicle devices of the OTA campaign, wherein the first vehicle device is one of the target vehicle devices of the OTA campaign.

19. The method of claim 16, wherein the query is a first query, the method further comprising:
   receiving a second query from a third vehicle device about whether the first vehicle device has the software fault; and
   transmitting a response to the second query to the third vehicle device, the response including an indication of whether the first vehicle has the software fault.

* * * * *